United States Patent [19]

Harada

[11] Patent Number: 4,607,439

[45] Date of Patent: Aug. 26, 1986

[54] LAMINATED SHEET AND A METHOD FOR PRODUCING THE SAME

[75] Inventor: Kunihiko Harada, Ashikaga, Japan

[73] Assignee: Achilles Corporation, Tokyo, Japan

[21] Appl. No.: 488,738

[22] Filed: Apr. 26, 1983

[30] Foreign Application Priority Data

Mar. 4, 1983 [JP] Japan .................. 58-35464

[51] Int. Cl.⁴ .................. A43B 23/00; B32B 7/00
[52] U.S. Cl. .................. 36/45; 428/284; 428/288; 428/304.4; 428/315.5; 428/259; 428/286; 36/47
[58] Field of Search .............. 428/246, 265, 290, 284, 428/286, 287, 288, 304, 315, 259; 528/275, 75; 525/374, 453, 452; 36/45, 47

[56] References Cited

U.S. PATENT DOCUMENTS

| | | | |
|---|---|---|---|
| 1,046,194 | 12/1912 | Keith | 428/246 |
| 1,405,511 | 2/1922 | Hirshfield | 428/246 |
| 3,642,563 | 2/1972 | Davis et al. | 36/45 X |
| 4,234,714 | 11/1980 | Earing et al. | 528/75 |
| 4,263,444 | 4/1981 | Graham et al. | 528/75 |

FOREIGN PATENT DOCUMENTS 224265 7/1959 Australia .................. 428/317.5

Primary Examiner—Lorraine T. Kendell
Attorney, Agent, or Firm—Ladas & Parry

[57] ABSTRACT

According to the invention, a novel laminated fabric sheet of excellent air permeability and a method for producing the same are provided. The laminated sheet comprises a first base fabric including spun yarn and having previously been treated with a water and oil repellent, a rubber composition layer formed on the first base fabric and having a multitude of fine air passages therein and a second sheet of base fabric laminated on the rubber composition layer. The base fabric which has been treated with the water and oil repellent prevents the coated rubber composition from reaching roots of whisker fibers of the spun yarn in the base fabric and fine cells are thereby formed around the lower portion of the whisker fibers. Subsequent heating of the laminated sheet of fabrics for curing the rubber composition causes these fine cells to be inflated to form air passages through the cured rubber composition layer. The rubber composition layer includes, as its main ingredient, a product of reaction between liquid diene-polymer having at least two active hydrogen groups in the molecule and polyisocyanate.

19 Claims, No Drawings

LAMINATED SHEET AND A METHOD FOR PRODUCING THE SAME

DETAILED DESCRIPTION OF THE INVENTION

This invention relates to a laminated sheet and, more particularly, a laminated sheet of excellent air permeability.

For imparting air permeability to a laminated sheet, it has heretofore been practiced to add a blowing agent in an adhesive for producing foams in the adhesive or to use an adhesive which is mechanically processed to contain microporous cells of air or nitrogen gas in the adhesive. The prior art laminated sheets employing such methods, however, actually have no appreciable air permeability, though they have some degree of moisture permeability. There is another prior art method for producing microporous cells in polyurethane resin by coagulating N,N-dimethyl formamide solution of polyurethane resin in water. This method is effective for forming grain on poromeric or synthetic leather but is found unsuitable for providing air permeability in producing a laminated sheet by binding two fibrous base materials such as two woven fabrics or a woven fabric and knitting together. There is also another prior art method for imparting air permeability to a sheet-like material having no air permeability by having the sheet-like material pierced by a needle. This method is defective in that the fibrous base material is damaged, a sufficient number of perforations per unit area cannot be obtained and the finally obtained product is poor both in quality and appearance.

It is, therefore, an object of the present invention to provide a novel laminated sheet of excellent air permeability which has eliminated the above described disadvantages of the prior art methods.

Laborious studies made by the inventors of the present invention on the mechanism of building of air permeability in a laminated sheet of fabrics have resulted in the finding, which has led to the present invention, that a laminated sheet made by coating a rubber composition containing liquid diene-polymer having at least two active hydrogen groups and polyisocyanate as its main ingredients on a sheet of base fabric including spun yarn and having previously been treated with water and oil repellent, laminating another sheet of base fabric on the coated rubber composition and heating the laminated sheet creates many fine and stable air passages in the rubber composition layer and thereby possesses excellent air permeability. It has been found that the base fabric which has been treated with the water and oil repellent prevents the coated rubber composition from reaching roots of whisker fibres of the spun yarn in the base fabric and fine cells are thereby formed around the lower portion of the whisker fibres. The subsequent heating of the laminated sheet of fabrics for curing the rubber composition causes these fine cells to be inflated to form air passages through the cured rubber composition layer.

According to the invention, there is provided a laminated sheet comprising a first base fabric including spun yarn and having previously been treated with a water and oil repellent, a rubber composition layer formed on said first base fabric and having a multitude of fine air passages therein and a second sheet of base fabric laminated on said rubber composition, said rubber composition layer including, as its main ingredient, a product of reaction between liquid diene-polymer having at least two active hydrogen groups in the molecule and polyisocyanate.

There is also provided a method for producing such laminated sheet comprising steps of preparing a first base fabric including spun yarn and having previously been treated with a water and oil repellent, mixing and stirring a rubber composition including, as its main ingredients, liquid diene-polymer having at least two active hydrogen groups and polyisocyanate by a mixing-dispensing machine, dispensing the mixed rubber composition from said mixing-dispensing machine and coating said rubber composition on said first base fabric, laminating a second base fabric on said rubber composition and heating the laminated sheet.

In this specification, the term "base fabric including spun yarn" means all fibrous materials including woven and non-woven fabrics and knittings including spun yarn such, for example, as a woven fabric in which at least either of the warp and weft consists of spun yarn. Suitable materials for the base fabric are staple fibre, cotton and polyester fibre. These materials may be used singly or as mixed yarn.

As liquid diene-polymer having at least two active hydrogen groups which constitutes one of the main ingredients of the rubber composition, polybutadiene, polyisoprene, polychloroprene, butadiene-isoprene copolymer, acrylonitrile-butadiene copolymer and styrene-butadiene copolymer of an average molecular weight of 400–10,000 having fluidity at a room temperature and having active hydrogen groups such as hydroxyl, mercapto and amino groups at the ends of molecules are preferred.

As polyisocyanate which is the other main ingredient of the rubber composition, preferable ones are biphenyl diisocyanate, biphenyl methane diisocyanate, naphthalene diisocyanate, toluene diisocyanate, hexamethylene diisocyanate and isophorone diisocyanate and modifiers, derivatives and crude materials thereof and isocyanate prepolymers which are products of reaction between these isocyanates and polyols and have two or more isocyanate groups. Non-yellowing isocyanate is not suitable for the purpose of this invention, for, as will be described later, it has been found indispensable for forming of cells in the rubber composition that inflation of the cells take place concurrently with curing of the rubber composition and non-yellowing isocyanate is very slow in reaction with a result that cells formed in the rubber composition are crushed by the subsequently occurring reaction.

If the mixing ratio (molar ratio) of the diene polymer having active hydrogen groups in the molecule to polyisocyanate is below 1/0.9, adequate polymerization and adhesion strength cannot be achieved and, in an extreme case, the rubber composition becomes excessively viscous. If the molar ratio exceeds 1/1.3, the isocyanate group becomes greatly in excess with a result that the product of reaction becomes fragile and its spreading and adhesive qualities as well as its drapability and softness decrease. Accordingly, the molar ratio of the diene polymer having active hydrogen groups to polyisocyanate should preferably be within a range between 1/0.9 and 1/1.3.

Additives which may be selectively added to the rubber composition include a cross-linker, a blending polyol, fillers such as calcium carbonate, clay and talc, catalysts such as dibutyl tin dilaurate and stannous octoate, antioxidants, ultraviolet ray absorbers, pigments, antistatic agents and plasticizers. If necessary, an organic solvent having no active hydrogen may also be used for dispersion of the respective additives.

As the cross-linker, hydroxyl compounds of a low molecular weight having two or more functional groups may preferably be used. They are, for example, 1,4-butanediol, 1,5-pentanediol, ethyleneglycol, diethyleneglycol, 1,6-hexanediol, neopentylglycol, glycerin, diethanolamine, triethanolamine, trimethylolpropane, hydroquinone, bisphenol A, N,N-bis(2-hydroxypropyl) aniline, N,N-bis(2-hydroxyethyl) aniline and ethylenediamine. The mixing ratio of the cross-linker and the liquid diene polymer is 50 parts or less by weight, preferably 1-20 parts, of the cross-linker per 100 parts of the liquid diene polymer.

As the blending polyols, all polyols used for urethanating which are blendable with the liquid diene polymer may be used. Suitable polyols include both polyester polyol and polyether polyol. These polyols may be of any number of functional groups and of any molecular weight but those having multiple primary hydroxyl groups at the molecule ends are preferable.

It has been found that in a case where an adhesive compound containing active hydrogen groups and having a high film forming ability, e.g., a compound of a large molecular weight, is coated in a state of solution on a fabric, the adhesive compound readily forms a serial film due to volatilization of the solvent so that air passages sufficient to impart air permeability to the laminated sheet cannot be formed through the filmed adhesive compound, even if the adhesive compound is coated on a woven fabric made of spun yarn which has whisker fibre of spun yarn or on a pile fabric and subsequently another woven fabric or knitting is laminated on the coated adhesive compound. Air permeability herein means air permeability of 0.5 cc/cm$^2$/sec or over measured by a fabric air permeability tester(AIR PERMEABILITY METER OF FABRICS (trademark) made by Toyo Seiki Mfg. Corp.). Accordingly, it is essential for a compound having active hydrogen groups to be used as a main ingredient of the adhesive in producing the laminated sheet according to the invention to be of a relatively low molecular weight and have sufficient fluidity when the compound is heated and, in addition, to be highly reactive with polyisocyanate and have sufficient cohesion force required for an adhesive. The above described liquid diene polymer having at least two active hydrogen groups is found to be the most suitable adhesive satisfying the above conditions. Polyether polyols and polyester polyols exhibit similar behaviour but their speed of reaction is extremely slow and their adhesive force is inadequate so that they are not suitable for practical uses such as for shoes and clothes.

As the second base fabric, fibrous materials such as cotton staple fibre, hemp, wool, nylon, Tetoron(-trademark) and rayon processed to fabrics such as woven and non-woven fabrics and knittings may be used. Woven fabrics made of spun yarn, particularly those having been treated with a water and oil repellent, are preferred.

As the water and oil repellent, those having a perfluoroalkyl group are preferable. As such repellents, commonly used ones such as Scotchguard FC-214 (trademark), Scotchguard FC-232 and Scotchguard FC-905 made respectively by Minnesota Mining and Manufacturing Co., Asahiguard AG-710 (trademark) made by Asahi Glass Chemical Corp., Dicguard F-50 (trademark) and Dicguard F-70 and Dicguard F-80 made respectively by Dainippon Inc and Chemical Corp. may conveniently be used. Further, a silicone compound having a water and oil repelling property such as DIC SILICONE SOFTER CONC S(trademark) made by Dainippon Ink and Chemical Corp. may also be used. It has been found, however, that its effect is generally poorer than a compound containing a perfluoroalkyl group.

The amount of the water and oil repellent to be included in the base fabric is 0.1-3.0 weight %, preferably 0.1-1.0 weight %, of the weight of the base fabric.

An embodiment of the method for producing the laminated sheet according to the invention will now be described.

A woven fabric made of spun yarn is treated with a water and oil repellent containing a perfluoroalkyl group. The treatment with the water and oil repellent may also be conducted before the spun yarn is woven to the fabric, i.e., in a state of spun yarn. If the fabric is made of spun yarn and non-spun yarn, the spun yarn only may be treated with the water and oil repellent in a state of yarn. A rubber composition including, as its main ingredient, liquid diene polymer of an average molecular weight of 400-10,000 having at least two active hydrogen groups in the molecule and polyisocyanate is coated on the woven fabric at a thickness of 0.05-0.50 mm. A common method for coating the rubber composition on the woven fabric made of spun yarn is to mix and stir the rubber composition continuously by a mixing and dispensing machine, dispense the mixed rubber composition on the woven fabric and coat it thereon adjusting the thickness of the coating by a doctor knife or like device. The coating may alternatively be effected by other methods such as employment of a roll coater or spray, hand coating and transfer coating.

Then, another sheet of fabric is laid on the woven fabric coated with the rubber composition and pressed to stick to the rubber composition layer. For pressing the fabric, a commonly used press roller is conveniently used but other means may also be used. Degree of pressing should preferably be determined in accordance with the following relation:

$$T_1+T_2-0.5 \leq T_3 \leq T_1+T_2$$

where $T_1$ is thickness(mm) of the woven fabric made of spun yarn, $T_2$ thickness(mm) of the other fabric and $T_3$ clearance(mm) between rolls in pressing the fabrics together.

The laminated sheet of the woven fabric, the rubber composition layer and the other fabric subsequently is heated for curing the rubber composition layer and simultaneously forming air passages in the rubber composition layer whereby a sheet-like material having excellent air permeability is obtained.

It has been found that as a result of decrease in viscosity of the liquid diene polymer composition due to heating, inflation of cells is facilitated. The employment of the rubber composition including the liquid diene polymer having at least two active hydrogen groups and polyisocyanate as its main ingredients is found to be extremely effective for the forming of air passages in the rubber composition layer for the reason that the reaction between diene polymer and polyisocyanate proceeds concurrently with inflation of cells in the rubber composition layer and, consequently, these cells, once formed, are not crushed by subsequent change in the structure of the rubber composition surrounding these cells. The laminated sheet according to the invention is suitable for materials of shoe-upper, clothes and pouches.

Examples of the invention and comparative examples will be described below. It should be noted that the examples are only illustrative and in no way restrict the scope of the invention. "Parts" referred to in both the example and comparative example means "parts by weight".

EXAMPLE 1

Twill weave(0.3 mm thickness) made of reinforced staple fibre was dipped in 50-fold water dilution of Scotchguard FC-232 (a water and oil repellent having a perfluoroalkyl group) and was wrung to the extent that the effective content of the repellent became 0.2% of the weight of the weave. The twill weave was then subject to drying and baking at 170° C. for 5 minutes.

Then, a rubber composition of the following ingredients was coated on the twill weave with thickness of 0.15 mm:

| | |
|---|---|
| NISSO PB G-2000 (polybutadiene made by Nippon Soda Corp. average molecular weight 2000) | 100 parts |
| dioctyl phthalate (plasticizer) | 40 parts |
| dibutyl tin dilaurate | 0.05 part |
| calcium carbonate | 50 parts |
| Milloinate (trademark polyisocyanate made by Nippon Polyurethane Co.) | 18 parts |

Thereafter, cotton twill weave(0.4 mm thickness) was laid on the coated rubber composition and the twill weaves thus superposed one upon the other were caused to pass through clearance of 0.6 mm defined between a pair of driving rolls. The twill weaves thereafter were heated at 80° C. for 30 minutes and a laminated sheet was thus obtained. Air permeability and moisture permeability of the laminated sheet were 3.5 cc/cm$^2$/sec and 3300 g/m$^2$/day, respectively. This laminated sheet used as material for shoe-upper was found to have sufficient air permeability and was therefore recommendable for such use from the sanitary standpoint.

EXAMPLE 2

Dicguard F-70 (having a perfluoroalkyl group) was applied to rayon twill weave of 0.3 mm thickness to the extent that the effective contents of the repellent became 0.4% of the weight of the weave. After the twill has thus been imparted with the water and oil repelling property, an adhesive composition of the following ingredients was coated on the twill with thickness of 0.15 mm:

| | |
|---|---|
| Poly bd R45 HT (made by Arco Chemical) | 100 parts |
| Ca CO$_3$ | 200 parts |
| Ti O$_2$ | 20 parts |
| Dibutyltindilaurate | 0.01 part |
| Polyisocyanate A-1 (prepolymer having NCO of 17.7% made by reacting polypropyrenetriol 700 and MDI) | 20 parts |

Thereafter, cotton twill weave (0.4 mm thickness) was immediately laid on the adhesive composition and the twill weaves thus superposed one upon the other were caused to pass through clearance of 0.7 mm defined between a pair of driving rolls for complete adhesion. The twill weaves were caused to pass through a hot blast oven having temperature gradient of 80° C.-120° C. for 10 minutes and, after being wound up, they were kept at the temperature of 60° C. for 24 hours for completing curing. A material for shoe upper having an excellent air permeability of 13.0 cc/cm$^2$/sec and a high moisture permeability of 2500 g/m$^2$/day was obtained.

COMPARATIVE EXAMPLE 1

A laminated sheet was produced in the same manner as in Example 1 except that an adhesive of the following composition was used instead of the rubber composition used in the present invention:

| | |
|---|---|
| CRISVON 4010HV (trademark, 2 liquid type polyurethane resin made by Dainippon Ink and Chemical Corp.) | 100 parts |
| Collonate L (trademark, polyisocyanate made by Nippon polyurethane Co.) | 8 parts |
| CRISVON A cell (trademark, amine catalyst made by Dainippon Ink and Chemical Corp.) | 5 parts |
| toluene | 20 parts |

The produced laminated sheet had no air permeability at all. This was considered to be ascribable to the high film forming ability of CRISVON 4010HV.

COMPARATIVE EXAMPLE 2

Nylon taffeta(70 denir nylon, warp 105/inch weft 85/inch) was treated with Scotchguard FC-232 (water and oil repellent) so that the effective content of the water and oil repellent became 0.2% of the weight of the nylon taffeta. The nylon taffeta then was coated with the same rubber composition as was used in Example 1 at a thickness of 0.15 mm. The same cotton cloth as was used in Example 1 was laminated on the rubber composition layer and the laminated sheet was heated at 80° C. for 30 minutes. The produced laminated sheet was totally lacking in air permeability. This was considered to be ascribable to the fact that the nylon taffeta which is not a spun yarn was used as the base fabric on which the rubber composition was coated.

What we claim is:

1. a laminated sheet comprising a first woven fabric in which at least a part of the warp consist of spun yarn having whisker fibers, said spun yarn having previously been treated with a water and oil repellent, a rubber composition layer having a plurality of fine air passages therein formed on said first fabric and a second fabric laminated on said rubber composition layer said rubber composition layer having as its main ingredient the reaction product of a liquid diene-polymer having at least two active hydrogen groups in the molecule and a polyisocyanate.

2. A laminated sheet as defined in claim 1 wherein said liquid diene-polymer is selected from a group consisting of polybutadiene, polyisoprene, polychloroprene, butadiene-isoprene copolymer, acrylonitrilebutadiene copolymer and styrene-butadiene copolymer of an average molecular weight of 400-10,000 having fluidity at a room temperature and having at least two active hydrogen groups such as hydroxyl, mercapto and amino groups in the molecule.

3. A laminated sheet as defined in claim 1 wherein a cross-linker is blended with said liquid diene polymer.

4. A laminated sheet as defined in claim 1 wherein a polyol is blended with said liquid diene polymer.

5. A laminated sheet defined in claim 1 wherein said polyisocyanate is selected from a group consisting of biphenylisocyanate, tolylene diisocyanate, biphenyl methane diisocyanate, naphthalene diisocyanate, hexamethylene diisocyanate and isophorone diisocyanate and modifiers, derivatives and crude materials or biphenylisocyanate, tolylene diisocyanate, biphenyl methane diisocyanate, naphthalene diisocyanate, hexamethylene diisocyanate and isophorone diisocyanate.

6. A laminated sheet defined in claim 1 the molar ratio of the active hydrogen groups and the isocyanate groups is 0.90–1.30.

7. A laminated sheet defined in claim 1 wherein said water and oil repellent contains a perfluoroalkyl group.

8. A laminated sheet as defined in claim 1 wherein said base fabric including spun yarn and having previously been treated with a water and oil to repellent contains 0.1–3.0 weight % of the water and oil repellent of the weight of said base fabric.

9. A laminated sheet comprising a first woven fabric in which at least a part of a weft consist of spun yarn having whisker fibers, said spun yarn having previously been treated with a water and oil repellent, a rubber composition layer having a plurality of fine air passages therein formed on said first fabric and, a second fabric laminated on said rubber composition layer, said rubber composition layer having, as its main ingredient the reaction product of a liquid diene-polymer having at lesat two active hydrogen groups in the molecule and a polyisocyanate.

10. A laminated sheet as defined in claim 9 wherein said liquid diene-polymer is selected from a group consisting of polybutadiene, polyisoprene, polychloroprene, butadiene-isoprene copolymer, acrylonitrile-butadiene copolymer and styrene-butadiene copolymer of an average molecular weight of 400–10,000 having fluidity at a room temperature and having at least two active hydrogen groups such as hydroxyl, mercapto and amino groups in the molecule.

11. A laminated sheet as defined in claim 9 wherein said polyisocyanate is selected from a group consisting of biphenylisocyanate, tolylene diisocyanate, biphenyl methane diisocyanate, naphthalene diisocyanate, hexamethylene diisocyanate and isophorone diisocyanate and modifiers, derivatives and crude materials of biphenylisocyanate, tolylene diisocyanate, biphenyl methane diisocyanate, naphthalene diisocyanate, hexamethylene diisocyanate and isophorone diisocyanate.

12. A laminated sheet as defined in claim 1 having an air permeability of 0.5 $cc/cm^2/sec$.

13. A laminated sheet as defined in claim 9 having an air permeability of 0.5 $cc/cm^2/sec$.

14. A shoe upper comprising the laminated sheet defined in claim 1.

15. A shoe upper comprising the laminated sheet defined in claim 2.

16. A shoe upper comprising the laminated sheet defined in claim 4.

17. A shoe upper comprising the laminated sheet defined in claim 6.

18. A shoe upper comprising the laminated sheet defined in claim 7.

19. A shoe upper comprising the laminated sheet defined in claim 8 is used as a material.

* * * * *

UNITED STATES PATENT AND TRADEMARK OFFICE
CERTIFICATE OF CORRECTION

PATENT NO. : 4,607,439

DATED : August 26, 1986

INVENTOR(S) : SOGABE, Yoji et al

It is certified that error appears in the above-identified patent and that said Letters Patent is hereby corrected as shown below:

Title Page, Item, [19] "Harada" should read -- Sogabe et al.
Page 1, Column 1, Item [75] which reads "Inventor: Kunihiko Harada, Ashikaga, Japan" should read -- Inventors: Yoji Sogabe, Ashikaga, Japan; Ikuo Mizoguchi, Ashikaga, Japan; Katsumi Uchida, Ohta, Japan; Kunihiko Harada, Ashikaga, Japan --.

Signed and Sealed this
Twenty-fifth Day of November, 1986

*Attest:*

DONALD J. QUIGG

*Attesting Officer*  *Commissioner of Patents and Trademarks*